United States Patent Office 3,350,381
Patented Oct. 31, 1967

3,350,381
PRODUCTION OF MODIFIED POLYOLEFIN WAXES
Hans Moeller, Wilhelmsfeld, Germany, assignor to Badische Anilin- & Soda-Fabrik Aktiengesellschaft, Ludwigshafen am Rhein, Germany
No Drawing. Filed Aug. 31, 1964, Ser. No. 393,379
Claims priority, application Germany, Sept. 4, 1963, B 73,385
13 Claims. (Cl. 260—94.9)

ABSTRACT OF THE DISCLOSURE

Production of a modified polyolefin wax, such as polyethylene or polypropylene, which contains 1–10% by weight of oxygen in combined form and 0.001 to 0.3% by weight of oxygen in the form of peroxy groups and which has an acid number of about 1 to 120, wherein the oxygen-containing polyolefin wax is reacted at an elevated temperature, e.g. 100–180° C., with an organic compound having at least one alkaline-reacting nitrogen atom such as the amides and imides of aliphatic and aromatic carboxylic acids and the general class of aliphatic, cycloaliphatic and heterocyclic amines and imines, including mono-, di-and tri-alkylene polyamines such as diethylaminopropyleneamine. N-vinylimidazole and the reaction product of triacrylformal with a 2-molar amount of an N,N-dialkylalkylenediamine are further examples of the nitrogen-containing organic compound. The resulting products are useful as additives to polyolefins, such as polypropylene, for improving dyeability with conventional dyes.

---

This invention relates to a process for the production of modified polyolefin waxes which cointain nitrogen atoms.

It is known that polyethylene may be oxidized with oxygen or gases containing oxygen. Products of different kinds are obtained depending on the conditions used. As stated in Canadian patent specification No. 476,476, products having a much greater melt viscosity than the initial material are obtained by the action of air on fused polyethylene at temperatures of about 160° C. According to another process, the increase in viscosity during oxidation of polyethylene having molecular weights between 1,000 and 8,000 may be controlled by oxidizing the polyethylene at a temperature which is as little as possible above the melting point of polyethylene. A similar result is achieved by vigorous stirring while passing in more than 2 to 3 liters of oxygen per kilogram of polyethylene per hour. By the said known methods, oxidized polyethylene waxes may be prepared which contain oxygen for example in the form of per oxide groups and carboxyl groups. As a measure of the number of carboxyl groups the acid number is usually used. The acid number is the amount of potassium hydroxide in grams which is neutralized by 100 grams of a substance containing carboxyl groups. Oxidized polyolefin waxes can be prepared with special advantage by the process of U.S. patent application Ser. No. 244,951 filed on Dec. 17, 1962 by Michael Jahrstorfer, Karl Schmeidl and Ludwig Vogel.

In the process according to the said U.S. patent application Ser. No. 244,951, emulsifiable polyolefin waxes are obtained by vigorously stirring molten polyethylene at temperatures of from 130° to 180° C. with oxygen or gases containing oxygen under superatmospheric pressure, between about 1 and 15 kw. being conveyed as mechanical energy by the stirrer per 100 kg. of polyethylene per hour and a total of 0.5 to 10 kg. of oxygen being absorbed. These waxes are particularly suitable for the production of dry-bright wax, emulsions and polishing compositions.

I have now found that modified polyolefin wax can be prepared with particular advantage by reacting a polyolefin wax containing oxygen atoms which contains a total of 1 to 10% by weight of oxygen in combined form and 0.001 to 0.3% by weight of oxygen in the form of peroxy groups and which has an acid number of at least 1, with an organic compound which has at least one unsubstituted or substituted alkaline-reacting nitrogen atom. Peroxy groups are radicals which contain the grouping –O–O–. Polyolefin wax which has a peroxide content of less than 0.001 or more than 0.3% by weight is not suitable for the process because products having undesirable properties are obtained. Polyolefins containing oxygen atoms, whose peroxide content is from 0.005 to 0.2% by weight are particularly suitable for the process. The peroxide content may be determined for example by using as solvent xylene which has been freshly distilled over sodium, as described by Criegee, Schnorrenberg and W. Becke, Annalen 565, 1949, page 7. The polyolefin wax containing oxygen atoms should have an acid value of at least 1. The higher the acid number of the polyolefin wax, the better is it suited for the process, and polylefin waxes having acid numbers of more than 20 are preferred. Suitable oxidized polyolefin waxes usually have acid numbers of from 1 to 120.

Waxes of this type may be made for example by the process of U.S. patent application Ser. No. 244,951 from polyolefin, particularly polyethylene and polypropylene, having molecular weights of 1,000 to 50,000.

Examples of suitable compounds having at least one nitrogen atom, which may be substituted, are amides and imides of saturated and unsaturated aliphatic or aromatic carboxylic acids, such as stearylamide, adipamide, benzamide, terephthalic diamide, N, N'-di-methylterephthalic diamide, phthalimide, acrylamide, N-methylacrylamide, methacrylamide, N-methylolmethacrylamide, N,N-dimethylaminoethyl acrylate and N,N-dimethylaminoethyl methacrylate, aliphatic and cycloaliphatic amines, such as N-methylethanolamine, N,N-dimethyltrimethylene diamine, hexamethylene diamine, N,N-diethylhexamethylene diamine, N-dimethyl-2-ethyloctamethylene diamine, 2-ethyloctamethylene diamine, diethylene triamine, dipropylene triamine, N-methyldipropylene triamine, triethylene tetramine, cyclohexylamine, N-methylcyclohexylamine, methylallylcyclohexylamine:

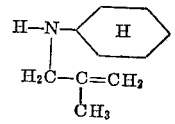

and also heterocyclic compounds containing nitrogen, such as vinylpyridines, vinylpyridine carboxylic acids, vinylimidazole, 4-methylimidazole, vinylcaprolactam, pyrazole, pyrazoline, triazole, piperazine, piperidine, diketopiperazine, N-methyl-N-aminopropylpiperazine, N-hydroxyethyl-N-aminopropylpiperazine, glyoxaline, vinylpyrrolidone and N,N',N"-triacryloylperhydrotriazine (triacrylformal). Particularly suitable compounds containing at least one unsubstituted or substituted nitrogen atom are vinylpyridines, i.e. 2-vinylpyridine, 3-vinylpyridine, 4-vinylpyridine; N-vinylimidazole; N-vinyl-N-methylacetamide; diethylene triamine and triethylene tetramine; compounds having the general formula:

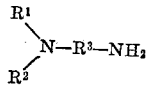

in which $R^1$ denotes an alkyl radical having one to four carbon atoms, $R^2$ denotes an alkyl radical having one to four carbon atoms and $R^3$ denotes an alkylene radical having two or three carbon atoms, preferably N-diethyltrimethylene diamine; and reaction products of triacrylformal with a 2-molar amount of an amine of the said general formula. To prepare reaction products of triacrylformal and amines having the general formula:

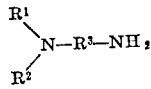

temperatures below 45° C., preferably of 30° to 40° C., are used in the presence of organic or inorganic solvents, such as chloroform or water, and the reaction products are obtained in the form of clear solutions. These solutions may be used for reaction with the oxygen-containing waxes. It is however also possible to isolate the reaction products of triacrylformal and the amines from their solutions and then to react them with the oxygen-containing waxes.

In the production of modified polyolefin waxes according to this invention elevated temperatures are generally used, particularly temperatures between 100° and 180° C., and the temperature range from 140° to 160° C. is preferred for the process. It is advantageous for solvents to be present during the reaction. Particularly suitable solvents are liquid saturated hydrocarbons, such as kerosine, having a boiling range of 150° to 190° C. When reacting nitrogenous compounds which contain double bonds the process according to this invention is carried out with exclusion of oxygen. If compounds containing nitrogen atoms but no double bonds are reacted according to this invention, exclusion of molecular oxygen is advantageous but not essential.

The relative proportions of the reactants in the process may be varied within wide limits. In general up to about 70% by weight or more, with reference to the amount of oxygen-containing polyolefin wax, is used of the compounds containing at least one unsubstituted or substituted nitrogen atom. When reacting according to the invention compounds which contain at least one unsubstituted or substituted nitrogen atom but no double bonds, it is advantageous to use equivalent amounts with reference to the content of carboxyl groups in the polyolefin wax. Nickel or aluminum may be introduced into the polyolefin wax during or after the reaction by adding one of their salts, such as aluminum or nickel acetate.

The products obtained by the process have a higher melting point than the oxygen-containing polyolefin waxes used as initial materials. Because of their good compatibility they may be added to polyolefins, particularly polypropylene, with particular advantage. Small amounts, i.e. up to about 15% by weight, preferably about 5 to 10% by weight, are added to the polyolefins. Moulding compositions of polypropylene and the reaction products prepared according to this invention of the said type can be dyed particularly homogeneously and fast with the usual dyes.

The invention is further illustrated by the following examples. The parts specified are parts by weight.

*Examples 1 to 3*

1,000 parts of a polyethylene wax (prepared as described in U.S. patent application Ser. No. 244,951 containing 4.1% by weight of oxygen and having a peroxide content of 0.15% by weight, and acid number of 30.9 and a melting point of 68° C.) is dissolved in 1,000 parts (Example 1), 810 parts (Example 2) or 4,000 parts (Example 3) of kerosine having a boiling range of 150° C. to 180° C. The solution is heated to 150° C. under reflux and while excluding oxygen, 1,000 parts of vinylimidazole (Example 1), 334 parts of vinylpyrrolidone (Example 2), or a mixture of 400 parts of triacrylformal and 1,000 parts of vinylimidazole (Example 3) is allowed to flow in. The whole is then stirred at the same temperature for another ninety minutes. The reaction mixture is then mixed with gasoline at room temperature and the gasoline then distilled off by introducing superheated steam. The reaction product separates in solid form. It is filtered off and dried under subatmospheric pressure at 180° C. The products obtained have the following properties:

| | Example | | |
|---|---|---|---|
| | 1 | 2 | 3 |
| Amount of product (parts) | 1,700 | 1,200 | 960 |
| Percent by weight of oxygen | 3.1 | 6.6 | 7.86 |
| Percent by weight of nitrogen | 11.6 | 2.3 | 12.7 |
| Acid number | 11.9 | 20.3 | 13.6 |
| Melting point, ° C. | 163 | 106 | 215 |

The products are suitable for addition to polypropylene to improve dyeability.

*Examples 4 to 6*

1,000 parts of a polyethylene wax containing oxygen and prepared according to U.S. patent application Ser. No. 244,951 is dissolved in 1,000 parts of kerosine having a boiling range of 150° C. to 180° C. The polyethylene wax has a melting point of 71.3° C., an oxygen content of 4.15% by weight, a peroxide content of 0.14% by weight and an acid number of 25.7. 458 parts of a reaction product of triacrylformal and N,N-diethyltrimethylene diamine is added under the conditions specified in Examples 1 to 3 and the further procedure of Examples 1 to 3 is followed, 1,130 parts of a product is obtained which has a melting point of 73.1° C., an oxygen content of 7.1% by weight, a nitrogen content of 3.75% by weight and an acid number of 13.3 (Example 4).

If 60 parts of nickel acetate (Example 5) or 60 parts of basic aluminum acetate (Example 6) is added to the reaction mixture prior to its being processed and acetic acid is removed while adding kerosine, reaction products are obtained having the following characteristics:

| | Example | |
|---|---|---|
| | 5 | 6 |
| Percent by weight of oxygen | 6.43 | 7.18 |
| Percent by weight of metal | ¹ 1.1 | ² 0.78 |
| Acid number | 12.0 | ---- |
| Percent by weight of nitrogen | ---- | 5.0 |

¹ Nickel.
² Aluminum.

The reaction product of triacrylformal and N,N-diethyltrimethylene diamine is prepared by allowing a solution of 260 parts of N,N-diethyltrimethylene diamine in 1,000 parts of water to flow into 249 parts of triacrylformal at a temperature of from 35° to 50° C. while stirring, heating the mixture half an hour later to 70° to 80° C. while stirring and keeping it at this temperature for one hour. The reaction product thus separates from the aqueous solution. It is filtered off, washed with water and dried. 458 parts of a reaction product is obtained which contains 16.4% by weight oxygen, 17.4% by weight of nitrogen and has a melting point of 182° C.

If the reaction described in the preceding paragraph be carried out at 35° to 40° C. and the product be not heated to a higher temperature, a clear viscous aqueous solution of a product containing 10.45% by weight of oxygen 19.0% by weight of nitrogen is obtained.

The products of Examples 4, 5 and 6 are eminently suitable for use as additives to isotactic polypropylene to improve its dyeability.

*Examples 7 and 8*

2,000 parts of a polyethylene wax containing oxygen and prepared according to U.S. patent application Ser. No. 244,951 is reacted in 8,000 parts (Example 7) or 1,000 parts (Example 8) of kerosine having a boiling range of 150° to 180° C. as described in Example 1 to 3 with 1,108 parts of triacrylformal (Examples 7) or a mixture of 1,000 parts of vinylimidazole and 300 parts of N,N-diethyltrimethylene diamine (Example 8). The polyethylene wax used has a melting point of 76.3° C., a peroxide content of 0.19% by weight, an oxygen content of 7.1% by weight and an acid number of 36.4. The results are as follows:

|  | Example | |
|---|---|---|
|  | 7 | 8 |
| Amount of product (parts) | 3,080 | 3,200 |
| Melting point, ° C | 240 | 143 |
| Oxygen content, percent by weight | 5.6 | 2.1 |
| Nitrogen content, percent by weight | 5.6 | 9.6 |
| Acid number | 23.5 | 18.4 |

The products are eminently suitable as additives to isotactic polypropylene to improve dyeability.

Example 9

A mixture of 429 parts of an oxygen-containing polyethylene wax (prepared according to U.S. patent application Serial No. 244,951 and having a peroxide content of 0.082% by weight, and oxygen content of 6.4% by weight, an acid number of 26 and a melting point of 81° C.) and 214 parts of acrylamide is heated for three hours at 140° C. as described in Examples 1 to 3. 620 parts of a product is obtained which has a melting point of 350° C., an oxygen content of 18% by weight, a nitrogen content of 4.7% by weight and an acid number of 10.6.

Example 10

A mixture of 1.50 parts of a polyethylene wax containing oxygen (prepared according to U.S. patent application Ser. No. 244,951 and having a melting point of 72° C., an oxygen content of 6.7% by weight, a peroxide content of 0.007% by weight and an acid number of 38.8) and 436 parts of vinylcaprolactam is heated for three hours at 140° C. and then for two hours at 220° C. 1,816 parts of a product is obtained which has an oxygen content of 6.8% by weight, a nitrogen content of 1.1% by weight and an acid number of 14.1. The melting point is above 250° C.

Example 11

74 parts of a polypropylene wax containing oxygen (prepared according to U.S. patent application Ser. No. 244,951 and having a melting point of 128° C., a peroxide content of 0.017% by weight, an oxygen content of 2.1% by weight and an acid number of 1.4) is reacted in 100 parts of kerosine having a boiling range of 150° to 180° C. with 100 parts of vinylimidazole as described in Examples 1 to 3. 171 parts of a product is obtained which has a melting point of 152° C., an oxygen content of 4.9% by weight, a nitrogen content of 9.4% by weight and an acid number of 0.3.

Example 12

500 parts of a polypropylene wax containing oxygen (prepared according to U.S. patent application Ser. No. 244,951 and having a melting point of 160° C., a peroxide content of 0.066% by weight, an oxygen content of 0.08% by weight and an acid number of 1) is reacted in 2,000 parts of kerosine having a boiling range of 150° to 180° C. in the manner described in Examples 1 to 3 with a mixture of 500 parts of N-methylolmethacrylamide and 500 parts of vinylimidazole. A product is obtained which has a melting point of 220° C., an oxygen content of 12.7% by weight and a nitrogen content of 11.7% by weight.

Example 13

300 parts of N,N-dimethyltrimethylene diamine is added at 150° C. to a melt of 1,500 parts of polyethylene wax containing oxygen (having an oxygen content of 6.7% by weight, a peroxide content of 0.01% by weight, an acid number of 39 and a melting point of 80° C.) and the water of condensation is distilled off.

The whole is cooled, the product filtered off and washed with water and methanol. It is then dried at 60% under subatmospheric pressure. 1,680 parts of a product is obtained which has an oxygen content of 4.2% by weight, a nitrogen content of 2.3% by weight and an acid number of 4.3. It has a melting point of 82° C. and is suitable as an additive to polypropylene to improve its dyeing properties in an outstanding way.

Example 14

300 parts of an oxidized polyethylene wax (containing 7.0% by weight of oxygen and having a peroxide content of 0.19% by weight, an acid number of 36.4 and a melting point of 76.3° C.) is dissolved in 1,300 parts of kerosine having a boiling range of 150° to 180° C., heated to 130° to 140° C. and a mixture of 75 parts of lauryl acrylate and 376 parts of vinylimidazole is allowed to drip in while excluding oxygen.

The reaction product is processed in the usual way. 676 parts of reaction product is obtained.

The product has very good compatibility with isotactic polypropylene. It contains 15.4%% by weight of nitrogen and has an acid number of 0.5 and a softening point of 60° to 70° C. It is eminently suitable as an additive to isotactic polypropylene for the production of textile fibers having good dyeability.

Example 15

2,460 parts of oxidized polyethylene wax, prepared in the usual way and having a peroxide content of 0.14% by weight, an oxygen content of 4.5% by weight, an acid value of 25.7 and a melting point at 80° C. is dissolved in 1.716 parts of xylene. 810 parts of vinylpyrrolidone is added to the solution at boiling temperature with vigorous stirring. One hour later, the reaction product is treated with steam and all low-boiling constitutents are distilled off. The whole is cooled and the reaction product is filtered off and washed with water. 2,790 parts of a modified wax is obtained which has an oxygen content of 6.6% by weight, a nitrogen content of 2.3% by weight, an acid number of 20.0 and a melting point of 106° C.

The product is suitable as an additive to polypropylene for the production of fibers having good dyeability.

Example 16

3,000 parts of oxidized polyethylene wax having a peroxide content of 0.15% by weight, an oxygen content of 4.1% by weight, an acid number of 30.9 and a melting point of 68° C. is dissolved in 1,300 parts of kerosine and then, under nitrogen and while stirring at 150° C., 700 parts of vinylimidazole is added to the solution.

After a reaction period of four hours, the whole is processed as described in Example 15 and 3,570 parts of a modified wax is obtained having an oxygen content of 4.4% by weight, a nitrogen content of 4.7% by weight, an acid number of 19.7 and a melting point of 199° C. The product is suitable as an additive to isotactic polypropylene to improve dyeability.

Example 17

1,000 parts of oxidized polypropylene wax having an oxygen content of 2.1% by weight, a peroxide content of 0.17% by weight and an acid number of 1.4 is dissolved in 2,000 parts of boiling methylcyclohexane under nitrogen as described in Example 15. 1,000 parts of vinylimidazole is allowed to flow in during the course of one hour and the whole is stirred at boiling temperature for another six hours.

A viscous solution is obtained which is allowed to flow into 1,000 parts of cold methylcyclohexane. The reaction product is thus precipitated. It is filtered off, treated with steam and dried at 80° C. under subatmospheric pressure. The reaction product obtained has an oxygen content of 3.7% by weight, a nitrogen content of 12.9% by weight, a melting point of 160° C. and an acid number of 0.4. It is suitable as an additive to polypropylene to improve dyeability.

Textile fibers prepared from mixtures of the reaction product with polypropylene may be dyed well with disperse dyes and reactive dyes and also with acid dyes.

*Example 18*

1,500 parts of oxidized polyethylene wax is reacted under nitrogen for twenty-four hours at 95° C. with 500 parts of 2-vinylpyridine and the reaction product is then heated for another hour at 150° C. The whole is processed as described in Example 15 and a product is obtained having an oxygen content of 4.2% by weight, a nitrogen content of 1.0% by weight, an acid number of 23 and a melting point of 83° C.

*Example 19*

500 parts of an oxidized polyethylene wax prepared by a conventional method is dissolved in 2,000 parts of dimethylcyclohexane having a boiling point of 124° C. The polyethylene wax has a melting point of 67° C., an oxygen content of 4.9% by weight, a peroxide content of 0.06% by weight and an acid value of 25. 500 parts of vinylimidazole is allowed to flow during two hours into the boiling solution under an atmosphere of nitrogen and the whole is then stirred for another two hours at this temperature.

The reaction product is then treated with steam, filtered off, washed with water and dried at 60° C. under subatmospheric presure. 910 parts of a product is obtained having a melting point of 80° C. and a nitrogen content of 14.0% by weight. It is suitable as an additive to isotactic polypropylene.

*Example 20*

1,000 parts of an oxidized polyethylene wax having a peroxide content of 0.14% by weight and an acid number of 25.7 is dissolved in 1,520 parts of gasoline having a boiling range of 80° to 110° C. in an autoclave, and in the course of one hour at 125° C. a mixture of 500 parts of vinylpyrrolidone and 500 parts of vinylimidazole is added. The reaction is over after 3½ hours. 1,800 parts of a product is obtained which has a melting point of 216° C., a nitrogen content of 10.5% by weight, an oxygen content of 10.1% by weight and an acid number of 12.

*Example 21*

A mixture of 1,500 parts of oxidized polyethylene wax having an oxygen content of 6.7% by weight, a peroxide content of 0.007% by weight, an acid number of 38.8 and a melting point of 72° C., and 350 parts of diethylaminopropylene amine is heated for one hour at 140° C. A product is obtained which contains 2.4% by weight of nitrogen and 4.3% by weight of oxygen and which has an acid number of 4.3. It is suitable as an additive to polypropylene.

Polypropylene which contains about 2% by weight of the product may be dyed well with disperse dyes, neutral metal complex dyes and acid wool dyes.

*Example 22*

2,300 parts of oxidized polyethylene wax which has a melting point of 76.3° C., a peroxide content of 0.19% by weight, an oxygen content of 7% by weight and an acid number of 36.4 is dissolved in 760 parts of boiling ethylbenzene, 20 parts of acetic acid is added and the whole heated to 155° C. 300 parts of diethylene triamine is then allowed to drip in and the water formed is distilled off azeotropically with ethylbenzene. The polyethylene wax obtained has a melting point of 183° C. and contains 2.7% by weight of nitrogen. Polypropylene which contains about 4% by weight of the product may be dyed well in the form of textile fibers with commercially available dyes.

*Example 23*

A mixture of 1,000 parts of oxidized polyethylene wax having a melting point of 75.3° C., a peroxide content of 0.17% by weight, an oxygen content of 6.8% by weight and an acid number of 33.6, and 1,000 parts of gasoline having a boiling range of from 150° to 180° C., is heated to 130° C. under nitrogen. 500 parts of vinylimidazole is then allowed to flow in during one hour and the whole is stirred for another ninety minutes at 130° C.

20 parts of glacial acetic acid is then added, the whole heated to 150° C. and 73 parts of diethylaminopropylamine is added. The reaction mixture is then kept for some time at this temperature and the water is distilled off together with the gasoline.

After the conventional treatment with steam, washing and drying, a product is obtained which contains 9.8% by weight of nitrogen and has a melting point of 200° C. and a hydroxyl number of 79.4.

*Example 24*

148.4 parts of an oxidized polyethylene wax having a melting point of 100° C., an acid number of 75.6 and an ester number of 47.6 and which contains 0.057% by weight of peroxide oxygen, mixed with 3 parts of glacial acetic acid are heated under nitrogen for thirty minutes at 120° C., then 13 parts of dipropylene triamine is added and condensation is carried out under a nitrogen atmosphere for thirty minutes at 150° C. The product is cooled and pulverized and washed several times, each time with 100 parts of acetone. A product is obtained having a nitrogen content of 2.5% by weight of nitrogen, 8.4% by weight of oxygen and a melting point of 100° C. It is eminently suitable as an additive to isotactic polypropylene to improve dyeability.

*Example 25*

74.2 parts of oxidized polyethylene wax having the properties recited in Example 24 is heated for half an hour at 120° C. with 1 part of acetic acid. 15.7 parts of N-methyl-N-aminopropylpiperazine is added and the whole heated for half an hour at 148° C. The reaction product obtained is pulverized and washed several times with acetone. The product has a nitrogen content of 2.9% by weight, an oxygen content of 7.4% by weight and a melting point of 82° C.

The product is suitable as an addition to polypropylene to improve dyeability.

*Example 26*

A mixture of 74 parts of oxidized polyethylene wax having the properties recited in Example 24 and 4 parts of 30% aqueous formaldehyde solution is heated under a nitrogen atmosphere for half an hour at 140° to 143° C. 15.7 parts of N-methyl-N-aminopropylpiperazine is then added at 150° C. and the whole is processed as described in Example 24. A product is obtained which has a nitrogen content of 2.6% by weight, an oxygen content of 7.4% by weight and a melting point of 90° to 95° C.

It is suitable for addition to polypropylene to improve dyeability.

*Example 27*

66.8 parts of an oxidized polyethylene wax having a melting point of 101° C., an acid number of 84, an ester number of 70 and a peroxide content of 0.066% by weight is heated under a nitrogen atmosphere to 120° C. in admixture with 1.5 parts of concentrated hydrochloric acid, then 7.2 parts of triethylene tetramine is added and the whole heated at 151° C. for half an hour. The reaction product is pulverized and washed several times with acetone. It has a nitrogen content of 4.7% by weight, an oxygen content of 9.4% by weight and a melting point of 100° C. The product is suitable as an addition to isotactic polypropylene to improve dyeability.

Example 28

66.8 parts of oxidized polyethylene wax having the properties recited in Example 27 in admixture with 1.5 parts of 10% aqueous ferrous sulphate solution is heated for half an hour at 100° C. and then reacted for half an hour with 7.2 parts of triethylene tetramine at 145° C. The reaction product is pulverized and washed several times with acetone.

The product contains 3.6% by weight of nitrogen, 9.3% by weight of oxygen and has a melting point of 95° to 100° C. It is eminently suitable as an addition to isotactic polypropylene to improve dyeability.

Example 29

500 parts of an oxidized polyethylene wax (having a peroxide content of 0.15% by weight, an oxygen content of 4.1% by weight, an acid number of 30.9 and a melting point of 68° C.) is dissolved at 120° C. in 3,000 parts of kerosine having a boiling range of from 150 to 180° C. and then, under an atmosphere of nitrogen and with stirring, a mixture of 500 parts of vinylimidazole and 144 parts of butanediolmonoacrylate is allowed to flow in in the course of three hours. Polymerization is continued for another hour.

The reaction product is treated with steam and the gasoline distilled off. An aqueous suspension is obtained, to which 1,000 parts of isopropanol is added. The reaction product is filtered off, washed with a small amount of isopropanol and dried at 80° C. under subatmospheric pressure. The product, which is capable of absorbing a large amount of water, has a nitrogen content of 9.7% by weight and a hydroxyl number of 100.5 and melts between 140° and 150° C. It is eminently suitable as an additive to isotactic polypropylene to improve dyeability.

Example 30

250 parts of oxidized polyethylene wax having the composition indicated in Example 29 is dissolved in 100 parts of kerosine. A mixture of 125 parts of acrylic acid and 125 parts of vinylpyrrolidone is added with stirring at 140° C. under an atmosphere of nitrogen. Stirring is continued for half an hour at the same temperature and 10 parts of acetic acid is then added. The whole is heated to 160° C., 272 parts of N-methyl-N-aminopropylpiperazine is added and the water of condensation is distilled off in the course of half an hour.

After cooling, the condensation product is precipitated with acetone and filtered off. The filtrate is washed and a product is obtained which has a nitrogen content of 8.3% by weight and an acid number of 82 and melts between 145° and 160° C. It is suitable as an additive to isotactic polypropylene for the production of textile fibers having good dyeability.

I claim:

1. A process for the production of a modified polyolefin wax which comprises: reacting a polyolefin wax containing a total of from 1 to 10% by weight of oxygen in combined form, 0.001 to 0.3% by weight of oxygen being in the form of peroxy groups, and having an acid number of between 1 and 120, with an organic compound having at least one alkaline-reacting nitrogen atom selected from the class consisting of amides and imides of aliphatic and aromatic carboxylic acids; aliphatic, cycloaliphatic and heterocyclic amines and imines; and the reaction products of triacrylformal with a 2-molar amount of an N,N-dialkyl-alkylenediamine in which the alkylene radical contains 2 to 3 carbon atoms and each alkyl substituent contains 1 to 4 carbon atoms.

2. A process as claimed in claim 1 wherein said reaction is carried out at a temperature of about 100° C. to 180° C.

3. A process as claimed in claim 1 wherein said reaction is carried out in a liquid saturated hydrocarbon having a boiling range of 150–190° C.

4. A process as claimed in claim 1 wherein there is reacted up to 70% by weight, with reference to the polyolefin wax, of said organic compound.

5. A process as claimed in claim 1 wherein the peroxy content of said polyolefin wax is about 0.005 to 0.2% by weight.

6. A process as claimed in claim 2 wherein said organic compound is an N,N-dialkyl-alkylenediamine in which the alkylene radical contains 2 to 3 carbon atoms and each alkyl substituent contains 1 to 4 carbon atoms.

7. A process as claimed in claim 2 wherein said organic compound is a vinyl pyridine.

8. A process as claimed in claim 2 wherein said organic compound is N-vinylimidazole.

9. A process as claimed in claim 2 wherein said organic compound is N-vinyl-N-methylacetamide.

10. A process as claimed in claim 2 wherein, said organic compound is N-vinylpyrrolidone.

11. A process as claimed in claim 2 wherein said organic compound is N-vinylcaprolactam.

12. A process as claimed in claim 2 wherein said organic compound is triacrylformal.

13. The product obtained by the process of claim 1.

References Cited

UNITED STATES PATENTS 3,223,695 12/1965 Gallangher _____ 260—94.9
3,278,513 10/1966 Jahrstorfer et al. ____ 260—94.9

JOSEPH L. SCHOFER, *Primary Examiner.*

LAWRENCE EDELMAN, *Assistant Examiner.*

UNITED STATES PATENT OFFICE
CERTIFICATE OF CORRECTION

Patent No. 3,350,381                                October 31, 1967

Hans Moeller

It is certified that error appears in the above identified patent and that said Letters Patent are hereby corrected as shown below:

Column 1, line 52, "per oxide" should read -- peroxide --. Column 2, line 40, "N-dimethyl-" should read -- N,N-dimethyl- --. Column 4, line 53, "35° to 50° C." should read -- 35° to 40° C. --. Column 5, line 25, "and oxygen content" should read -- an oxygen content --; line 34, "1.50 parts" should read -- 1,500 parts --; line 41, "1,816 parts" should read -- 1,916 parts --. Column 6, line 36, "1.716 parts" should read -- 1,716 parts --.

Signed and sealed this 25th day of November 1969.

(SEAL)
Attest:

Edward M. Fletcher, Jr.                        WILLIAM E. SCHUYLER, JR.
Attesting Officer                                 Commissioner of Patents